Aug. 2, 1966 G. E. GATTNER ETAL 3,264,608

ASCERTAINING THE POSITION OF WRITTEN SYMBOLS WHICH ARE TO BE AUTOMATICALLY IDENTIFIED

Filed May 14, 1962

3,264,608
ASCERTAINING THE POSITION OF WRITTEN SYMBOLS WHICH ARE TO BE AUTOMATICALLY IDENTIFIED

Günther E. Gattner and Rolf F. Jurk, Munich, Germany, assignors to Siemens & Halske Aktiengesellschaft, Berlin and Munich, Germany, a corporation of Germany Filed May 14, 1962, Ser. No. 194,287
Claims priority, application Germany, May 19, 1961, S 74,053
11 Claims. (Cl. 340—146.3)

Figure 1:
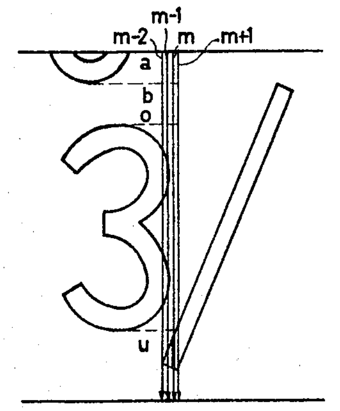

The invention disclosed herein is concerned with a method of and a circuit arrangement for ascertaining or determining the position of written symbols such as characters or numerals which are to be automatically identified.

The operation of equipment employed in the communication and data processing arts frequently entails the problem of automatically scanning written symbols used in conveying intelligence, for example, characters or numerals appearing on suitable copies or supports, with the aid of a scanning device, for example, a light-electrical scanning device, and thereafter processing the scanned symbols. The processing of the symbols may require identification thereof so as to enable, with the aid of suitable signals, operative control of communication and data processing devices dependent upon the symbols involved. It will often be required not only to scan and thereafter process a single individual symbol, but a whole symbol line or an entire symbol field, so as to enable the reading and processing of a text arranged therein in successive lines.

It is in connection with any automatic processing of a written symbol required that the respective symbol is contained within the range embraced by the scanning device. This requirement can be fulfilled with the aid of mechanical devices for shifting a copy containing given symbols, thereby using, if necessary or desired, exterior reference symbols for indicating whether symbols which are to be processed are within the range of the scanning device. It is not deemed necessary to enter into explanations concerning such devices, as it will be assumed that the symbols which are to be processed are within the range that is being scanned by the scanning device.

Upon scanning a copy, it will be generally unknown from the outset at which point of the copy or picture range, which is embraced by the scanning device, is located a symbol which is to be processed; shifting may occur within given limits in one or the other coordinate direction with respect to a position of the symbols that may possibly be expected.

In order to eliminate the effects of such shifting, it is known to initially carry out a preliminary scanning of the symbol which is to be identified, for purposes of centering, that is, spatial alignment of the scanning device with respect to a symbol contained in the image or picture range thereof, or, vice versa, to effect a spatial alignment of the symbol with respect to the scanning device, and to thereafter undertake a main scanning for the purpose of reading the symbol. For example, the procedure in connection with a known scanning arrangement is to ascertain, in the course of a preliminary scanning operation of a symbol to be identified, the minimum spacings between the symbol and the left and lower margins of the scanned rectangle or the minimum spacings between all four margins of the scanned rectangle, especially by counting out the scanning columns lying at the left and right of the symbol, which do not contain a black surface element, or counting out the white surface elements lying in each column above and below the symbol, and storing the minimum number of such surface elements up to a desired scanning instant. The results obtained by the counting out operation are thereupon converted into an analog voltage for the null point shifting of the scanning beam in the subsequent main scanning of the symbol.

The centering carried out in known systems is based upon the assumption that only one single symbol, namely, the symbol which is to be read, is contained in the rectangle swept by the scanning, because the subsequent recognition of the symbol is effected based upon full alignment of the scanned symbol with a predetermined comparison symbol, which is ascertained in the course of an alignment comparison operation.

However, the image or picture range encompassed by the scanning device may generally contain further symbols in addition to the symbol that is to be processed. In order to avoid erroneous processing, the symbol to be processed must be for the time of processing thereof, distinguished from the other symbols. It is moreover possible that the picture range encompassed by the scanning device contains flaws, smudges or soilings or the like which must not enter into the processing of a symbol.

In order to enable under such conditions the automatic processing always of only one symbol, it has been proposed to ascertain for the determination of the position of symbols scanned by a scanning device and to be automatically processed by a processing device, in a preliminary scanning operation of the symbols which are contained in the picture range encompassing substantially a written line, by projection of the range of the written line in the direction of the scanning columns, always the frontal and rearward borders of a symbol. There is then ascertained, from a projection of the narrower range which is thereby obtained, in which is contained a symbol to be processed, in the other coordinate direction the upper and lower borders of the symbol and therewith also the direct symbol range. The processing device thereafter delivering a processing result incident to a subsequent main scanning following the preliminary scanning, only with respect to the scanning of the respective symbol. The determination of the narrower range and/or the symbol range, from a projection of the respectively next larger partial range, makes it possible to effect automatic processing of just one symbol, in a case in which the picture or image range encompassed by the scanning device contains in the same written line in addition to the symbol to be processed, further symbols or parts of symbols of neighboring lines, whereby the height of the picture range may be such that symbols of two different written lines are ordinarily not completely embraced. However, the proposed method requires a plurality of scanning operations in order to ascertain the position of a symbol within a written line.

It is also known, in connection with the scanning of symbols arranged in a written line, to permit the vertical scanning of a symbol, for the step-by-step processing of the individual symbols, to proceed from left to right until no black range is encountered during a complete vertical scanning, which signals the end of the scanned symbol. However, it must be presupposed in such determination of the end of a symbol, that the area or range of a written line which is encompassed by the scanning contains only the symbols which are to be processed, but does not contain any soiling marks or parts of symbols of neighboring lines or the like. Such requirement is generally not fulfilled.

The invention shows another way for reading and processing symbol by symbol a text arranged in written lines.

The invention is concerned with means for ascertaining the rearward limits or borders of written symbols which are to be scanned by a scanning device and automatically processed by a processing device.

In an apparatus according to the invention, a columnar scanning of the scanning area is employed whereby any signal elements are generated which represent, in each case, the scanning of a surface element for the presence or absence of a symbol portion along the scanning column. Means is also provided for forming projection signal elements which represent the projection transversely to the scanning direction of the already scanned portion of the scanning range. A comparison is then effected, by suitable means, of the elements of the two signals which positionally correspond in column direction, following which a further comparison is effected, by further comparison means associated with said first comparison means, between successive pairs of such projection and scanning signal elements corresponding to one another. This last mentioned means is utilized to ascertain, in the succession of pairs of signal elements consisting of projection signal elements and scanning signal elements corresponding to one another, the occurrence of a number of signal element pairs "10" which consist in each case of a projection signal element "1" corresponding to a surface element covered by symbol portions, and a scanning signal element "0" corresponding to a surface element not covered by a symbol portion and which lie between two signal element pairs "00," consisting in each case of two signal elements "0" corresponding to surface elements not covered by symbol portions. The identification of the rearward elements of a symbol just scanned is thereby established.

The invention makes it possible, by always ascertaining when the rearward border or limit of a symbol is encountered, to scan a written line in a single continuous scanning operation while nevertheless reading and processing the text symbol-by-symbol, whereby soiling marks or the like lying above or below the symbol in the scanning column forming the rearward limits thereof are initially eliminated and therefore cannot affect the determination of the end of the symbol, due to the fact that it is unnecessary to ascertain a scanning column which is completely free of scanning signal elements corresponding to the coincidence with an element of a line course.

It is, according to a further object and feature of the invention, possible to monitor in the sequence of pairs of signal elements consisting of a projection signal element and a scanning signal element, said elements mutually corresponding by the same columnar position. It is thereby possible to ascertain the appearance of directly successive signal element pairs the number of which is not below a minimum number and does not exceed a maximum number of signal element pairs which consist respectively of a projection signal element corresponding to the coincidence with an element of a line course and a scanning signal element corresponding to the non-coincidence with an element of a line course, which pairs lie directly between signal element pairs consisting respectively of two signal elements corresponding to the non-coincidence with respect to an element of a line course. This makes it possible to distinguish from the outset symbols which cannot represent identifiable symbols, owing to being too short or too tall, from symbols which due to their height might be identifiable, which is subsequently established by an identifying device.

According to still another feature of the invention, it is possible to count the sequence of mutually directly bordering projection signal elements representing the projection of the respective already scanned part of the scanning region, which sequences correspond to the coincidence with an element of a line course, and to mark the counting steps always at the instant of ascertaining the rearward limits or borders of a written symbol which is just being scanned. In the course of a renewed counting of the projection signal element sequences contained in the projection of the respective already scanned part of the scanning region, upon reading such a marked counting step, a signal can be produced for the duration of the scanning along the sequence just being reached, such signal indicating that the rearward limits of the respective symbol have been reached and also indicating the position thereof.

Further details of the invention will now be explained with reference to the accompanying drawing.

FIG. 1 explains the scanning of a symbol lying in a written line; and

Figure 2:
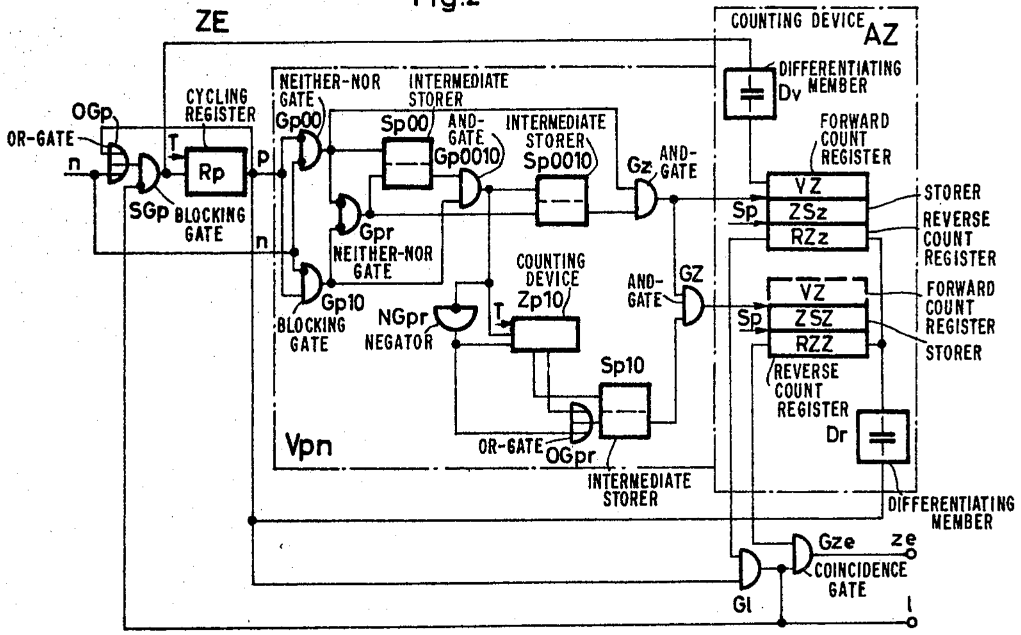

FIG. 2 shows a circuit arrangement for practicing the method according to the invention.

Referring now to FIG. 1, the illustrated symbol is depicted as being scanned along the scanning columns (lines) $m-2$, $m-1$, the scanning column $m$ which marks the rearward limits of the written symbol 3 already running over part of the next following symbol which is represented by a slanting fractional line. FIG. 1 will be referred to again in the course of the following explanations concerning the circuit arrangement shown in FIG. 2.

The device ZE shown in FIG. 2, for ascertaining the rearward limits of a symbol which is being scanned, comprises a comparison device V*pn* for the comparison of the projection signal elements representing the projection of the already scanned part of a scanning region or area transverse to the scanning direction, with the corresponding scanning signal element of the column which is just being scanned. To one input *p* of the comparison device V*pn* is connected a cycling register R*p* which has a capacity permitting the storage of signal elements lying in one scanning column. The cyclic register R*p* receives from the input *n* over an Or-gate OG*p* and a blocking gate SG*p*, which is initially conductive, the scanning signal elements "1" of each scanning column (*n*) which elements correspond to the coincidence with an element of a line course of the scanned symbol. The output of the cyclic register R*p* is over the Or-gate OG*p* and the blocking gate SG*p* fed back to the input thereof. The cyclic register thus always receives the projection of the already scanned part of the scanning region. The projection signal elements stored in the cyclic register R*p* are conducted to one input *p* of the comparison device V*pn*, while the corresponding scanning signal elements of each scanning column (*n*) are at the same time extended to the other input *n* thereof. The comparison device V*pn* thereupon ascertains in the sequence of pairs of signal elements consisting of projection signal elements and scanning signal elements which are mutually corresponding as to position in the direction of the scanning columns, the appearance of directly successive signal element pairs "10" which consist respectively of a projection signal element "1" corresponding to the coincidence with an element of the line course and a scanning signal element "0" corresponding to non-coincidence with an element of a line course, such signal element pairs "10" lying between two signal element pairs "00" which consist of signal elements "0" corresponding to the non-coincidence with an element of a line course. The comparison device V*pn* is for this purpose provided with a "Neither- Nor" gate Gp00 and with a blocking gate Gp10, to which are simultaneously conducted, in step-like manner, over the respective inputs *n* and *p*, the scanning signal elements produced incident to the column-wise scanning of a symbol and indicating the presence or absence of an element of a line course and also the projection signal elements corresponding within a scanning column to the position thereof. The Neither-Nor gate Gp00 is connected, over a 1-bit intermediate storer Sp00, with the input of an And-gate Gp0010, the other input of which is connected with the output of the blocking gate Gp10. The And-gate Gp0010 is connected, over an intermediate storer Sp0010, with an input of an And-gate Gz, the other input of which is connected with the output of the Neither-Nor gate Gp00. This And-gate Gz is connected with an input of a third And-gate GZ, the other input of which is connected with a bistable flip-flop circuit Sp10, the latter being controlled by a counting device Zp10 which is connected with the output of the first And-gate Gp0010. The control input of the bistable flip-flop circuit Sp10 is connected to the counting stage Zp10 which ascertains the previously noted minimum number of signal element pairs and its restoring input is connected with counting stage Zp10 which ascertains the maximum number of signal element pairs.

The comparison device Vpn operates as follows:

It is assumed that a written symbol which is to be identified is scanned column by column and that the scanning signal elements "0" and "1," respectively, for ascertaining the rearward limits or borders of the symbol which is being scanned, which are produced by the scanning device (not shown in FIG. 2), are conducted to the input *n* of the device ZE. Of these scanning signal elements, those which coincide with an element of the line course of the scanned written symbol, corresponding to the scanning signal element "1" are, over the Or-gate OGp and the initially conductive blocking gate SGp, entered into (written into) the cyclic register Rp at a point which corresponds to the appearance of the scanning signal elements within a column just being scanned. The cycling register Rp thereby receives over the line T synchronizing impulses, operating as shift impulses, which in a manner described at another point subdivide the scanning signal produced by the scanning device, into a finite number of scanning signal elements. Since the cycling register Rp has a capacity just sufficient to allow the storing of the signal elements contained in a scanning column, this will result in the entry, always in the same place of the cycling storer, of the scanning signal elements, corresponding to the coincidence with an element of the line course, which always appear in a scanning column, within the various scanning columns, at the same level. The cycling register Rp therefore always receives the projection of the already scanned part of the scanning region transverse to the scanning direction. Since one input *p* of the comparison device Vpn is connected to the output of the cyclic register *Rp*, the comparison device Vpn will receive at its input *n* a scanning signal element from the scanning device, and simultaneously at its input *p* a projection signal element corresponding thereto.

It shall now be assumed that a scanning operation has progressed to a point that a symbol to be identified has been scanned and that there is being scanned the first scanning column lying in back of the symbol in which there is no scanning signal element "1" corresponding to a coincidence with an element of a line course of the symbol which had just been scanned. FIG. 1 may at this point be referred to for aiding the explanation. In the conditions represented in FIG. 1, the column *m* is now to be scanned, whereby such scanning, in contrast with the scanning column $m-2$ and $m-1$, does not involve the written symbol 3 (which had just been scanned) and therefore does not contain a scanning signal element "1" corresponding to the coincidence with an element of the line course of this symbol. In the cycling register Rp is in such case stored the projection of the scanned symbol transverse to the scanning direction. There additionally may be present parts of projections of further symbols lying above or below the scanned symbol, with more or less extensive spacings between such projection parts and the projection of the symbol just scanned, which is to be identified, in the place of which the cycling register Rp has stored projection signal elements "0" corresponding to the non-coincidence with an element of a line course of a scanned symbol. When the scanning point during the scanning of the first column lying in back of the scanned symbol (*m* in FIG. 1) reaches the level of the upper border of the scanned symbol, that is, in the condition as shown in FIG. 1, the level just above the dash line *o*, the comparison device Vpn will simultaneously receive at its inputs *p* and *n* a projection signal element "0" and a scanning signal element "0," both of which correspond to the non-coincidence of the scanning point with respect to an element of a line course. Thus, the coincidence condition is present for the Neither-Nor gate Gp00, with the consequence that the next successive intermediate storer Sp00 is activated. Accordingly, the "1" will exist at the input of the And-gate Gp0010, which is connected with the intermediate storer Sp00, and the And-gate Gp0010 is thereby prepared for the coincidence condition. Upon further progress of the scanning operation, within the scanning column lying immediately in back of the symbol which had just been scanned, the scanning point will reach the height of the respective symbol, and the comparison device Vpn will receive from the cycling register Rp projection signal elements "1" corresponding to the coincidence of the scanning point with an element of the line course of the symbol, while the input *n* of the comparison device Vpn will of course continue to receive further scanning signal elements "0." Referring to FIG. 1, this is the case incident to the scanning of the column *m* between the upper border of the symbol which had just been scanned, indicated by the dash line *o*, and the lower limit of the symbol indicated by the dash line *u*. There is thus obtained the coincidence condition for the blocking gate Gp10. Consequently, there is now also obtained the coincidence condition for the And-gate Gp0010, one input of which is connected with the blocking gate Gp10, thereby effecting activation of the intermediate storer Sp0010 and thus preparing the And-gate Gz at one input thereof for the coincidence condition. The two intermediate storers Sp00 and Sp0010 are restored to normal over the Neither-Nor gate Gpr, at a time when neither the Neither-Nor gate Gp00 nor the blocking gate Gp10 are activated, that is, when no sequence of signal element pairs "10" appears after a signal element pair "00" and when this sequence element pair "10" is interrupted, that is, concluding a signal element pair other than a signal element pair "00."

To the And-gate Gp0010 is also connected the counting device Zp10 which is, just as the cycling register Rp, synchronized over a timing line T, so that the counting device Zp10 is advanced by a counting step responsive to appearance of a timing pulse and when the coincidence condition is fulfilled for the And-gate Gp0010, while such counting device is, upon non-appearance of the coincidence condition at the And-gate Gp0010, restored to normal over the negator NGpr and the Or-gate OGpr. In the event that the projection of a scanned symbol indicates a length, as seen in the direction of the scanning columns, which exceeds a predetermined minimum value, the counting device Zp10 will reach a counting step at which will be activated the serially disposed flip-flop circuit Sp10. When the scanning point reaches, within the scanning column *m* (see FIG. 1) the level of the lower limit of the symbol which had just been scanned, that is, the level indicated by the dash line *u*, signal elements "00" will again be conducted to the two inputs $p$ and $n$ of the comparison device V$pn$, which signal elements correspond to the non-coincidence of the scanning point with an element of a line course. The coincidence condition for the Neither-Nor gate G$p$00 is thus again obtained, with the consequence that the coincidence condition also results for the And-gate G$z$, one input of which is connected with the Neither-Nor gate G$p$00, while the other input has already been activated from the intermediate storer S$p$0010. Accordingly, at the output of the And-gate G$z$ will obtain the "1" condition.

In the event that the intermediate storer S$p$10 is activated from the counting device Z$p$10, owing to the presence of a projection length which exceeds a predetermined minimum value and which moreover does not exceed the predetermined maximum value, the "1" condition will also prevail at its output, and the coincidence condition will be present for the And-gate GZ, such condition indicating that the rearward limits of a scanned symbol had been reached. The counting device Z$p$10 is thereby operative to bring about activation of the output of the And-gate GZ only upon ascertaining in the sequence of pairs of signal elements, consisting, respectively, of mutually corresponding projection signal elements and scanning signal elements, the appearance of a number of directly successive signal element pairs "10," which number does not lie below a predetermined minimum number (effected by the connection of one of the inputs of the bistable flip-flop circuit S$p$10 to a given counting stage of the counting device Z$p$10), and provided that such number does not exceed a predetermined maximum number (effected by the connection of the restoring input of the flip-flop circuit S$p$10 to a further counting stage of the counting device Z$p$10).

It is thus possible to ascertain, with the aid of checking the projection length in the described manner, whether the projection involved actually represents the projection of a scanned symbol which is to be identified, since such symbol is of a size which is within given known limits. In the event the projection length is less or greater than could be expected in the projection of a symbol to be identified, the intermediate storer S$p$10 will respectively not be activated or restored to normal, when the output of the And-gate G$z$ is activated, thus avoiding activation of the next successive And-gate GZ.

Accordingly, the activation of the And-gate G$z$ indicates that the rearward limits or borders of a symbol or the like had been reached, while the activation of the And-gate GZ indicates that the size of the symbol is such as to denote a symbol which is to be identified.

The device ZE shown in FIG. 2, for ascertaining the rearward limits of a scanned symbol, also comprises a further counting device AZ for counting the sequences of directly mutually bordering signal elements "1," contained in the projection of the respective already scanned part of the scanning region, and corresponding to the coincidence with an element of a line course. The counting device AZ includes for this purpose a forward count register VZ the input of which is over a differentiating member D$v$ connected with the input of the cyclic register R$p$ which is disposed ahead of the comparison device V$pn$. The differentiating member D$v$ may be omitted in a case in which the counter VZ is as such provided with a differentiating input. At the input of the counting device AZ, which leads to the forward count register VZ (whereby the latter can be realized in known manner), therefore will obtain the "1" condition, so long as a scanning operation in a scanning column ($n$) extends in parallel with a sequence of mutually directly bordering projection signal elements "1" which correspond to the coincidence with an element of a line course, while the "0" condition will otherwise prevail. A positive count impulse is over the differentiating member D$v$ transmitted to the forward count register VZ, already at the instant at which the "1" condition takes the place of the "0" condition at the input. Accordingly, the forward count register counts the sequences of mutually directly bordering signal elements "1," which are contained in the projection of the already scanned part of the scanning region and which correspond to the coincidence with an element of a line course. That is, there will be counted the black sections contained in the projections of the respective already scanned part of the scanning region.

FIG. 1 may again be referred to for a more detailed explanation of the operation. Under the conditions represented in FIG. 1, three black sections will be counted in the above explained manner incident to the scanning of the column $m-1$ and incident to the scanning of the column $m$, namely, a first black section between the beginning $a$ of the scanning column and the dash line $b$, such first black section being part of the projection of only a small part of a symbol, a second black section extending from the dash line $o$ to the dash line $u$, such second black section forming the projection transverse to the scanning direction of the symbol 3 which had just been scanned and which is to be identified, and a third black section which is part of the already scanned part of the next following symbol, namely, the slanting fractional line.

A marker signal is extended to the counting device AZ always at the instant when the coincidence condition appears for the And-gate G$z$ of the comparison device V$pn$. This marker signal causes marking of the count position which had at such instant been reached by the fourth counting stage of the forward count register VZ, by storing such count position in an intermediate storer ZS$z$, the operations involving, for example, shifting in known manner a "1" signal element from a first counting stage over a second and third to a fourth counting stage of the forward counter VZ. A further marker signal is in completely analogous manner extended to the counting device AZ, always at the instant of appearance of the coincidence condition of the And-gate GZ of the comparison device V$pn$, such further marker signal effecting storing in a further intermediate storer ZSZ the count position which had just been reached by the forward counter VZ.

A synchronizing signal is in suitable manner, details of which are of no particular interest here, extended to a line S$p$, always at the beginning of the scanning of a scanning column, such synchronizing signal effecting the transfer of the count values stored in the intermediate storers ZS$z$ and ZSZ to the reverse count registers RZ$z$ and RZZ which are respectively connected therewith, whereby the forward count register VZ and the intermediate storers ZS$z$ and ZSZ are set back.

It may be mentioned at this point that all registers may be realized in known manner, whereby the previously marked count steps or positions are fed in parallel from the forward count register VZ into an intermediate register and are in parallel released from the latter, while being received from the associated reverse count register in parallel but serially released therefrom. This serial release is effected by connecting the control inputs of the two reverse count registers RZ$z$ and RZZ over a differentiating member D$r$ to the output of the cyclic register R$p$ which is disposed ahead of the comparison device V$pn$. Accordingly, the projection signal elements which before had been utilized for the control of the counting device AZ of the forward count register VZ, are again conducted to the counting device AZ, the differentiating member D$r$ being thereby operative to effect transfer of positive shift pulses to the reverse count registers RZ$z$ and RZZ, only responsive to a change of condition from "0" to "1" at the output of the cyclic register R$p$. Each of these shift pulses effects in the individual stages of the reverse count registers the shifting by one step to the left, of the "1" signal element which may have been stored therein. Accordingly, the reverse count register RZ$z$ releases at its first stage, always upon reaching a count step that had been marked before by the activation of the And-gate Gz, a signal "1" to an input of an And-gate G1, the other input of which is connected with the output of the cyclic register Rp. The coincidence condition for the And-gate G1 will therefore always appear at the instant at which the scanning point arrives in the scanning operation of the scanning column $(m+1)$, lying in back of the rearward limits of the scanned symbol, at the level of the beginning of the projection of a scanned symbol, that is, at the level of the upper limit of the symbol; the coincidence condition persisting up to the instant of arrival of the scanning point at the end of the projection of the involved symbol, that is, at its lower limit. It must be considered in this connection that there appear during this time interval, at the output of the cyclic register Rp, projection signal elements "1" which correspond to the coincidence with an element of a line course of the scanned symbol, while the condition "1" obtains at the same time at the first stage of the reverse count register RZz. There therefore appears at the output terminal 1 of the And-gate G1 a signal "1," constituting an erasure or extinguishing signal, which indicates that the rearward limits of the scanned symbol have been reached and at the same time the position of the symbol in the direction of the scanning columns. This extinguishing signal also affects the blocking input of the blocking gate SGp which is disposed ahead of the cyclic register Rp, thus preventing renewed entry of the projection of the involved symbol, the rearward limits of which had just been ascertained. Such an extinguishing signal is, under the conditions shown in FIG. 1, released incident to the scanning of the columns $m+1$ during the time interval in which the scanning point is in the scanning column $m+1$ positioned between the levels *a* and *b* or *o* and *u*.

To the output of the coincidence gate G1 is also connected one input of a further coincidence gate Gze, the other input of the latter being connected with the first stage of the reverse count register RZZ. The "1" condition will appear at the first stage of the reverse count register RZZ only when the output of the cyclic register Rp reaches, in the course of renewed extension of the projection elements to the counting device AZ, a count step or position which had been previously marked by the activation of the And-gate GZ of the comparison device Vpn. Accordingly, during the time interval in which the scanning point is, incident to the scanning of the column $m+1$, in FIG. 1, which lies in back of the rearward limits of a scanned symbol, between the levels denoting respectively the beginning and the end of the projection of a scanned symbol, that is, between the upper limit *o* and the lower limit *u* of the symbol 3, there will appear the coincidence condition for the And-gate G1 and also for the And-gate Gze. Likewise, at the output *ze* will appear the signal "1" signifying that the rearward limits of a scanned symbol had been reached and also indicating the position of the symbol in the direction of the scanning columns.

It will therefore be seen that, in the arrangement shown in FIG. 2, a so-called extinguish or erase signal "1" is always produced for ascertaining the rearward limits of a symbol when the scanning point is, after the scanning thereof, between the levels of the upper and lower limits of the projection of such symbol, without thereby in anyway indicating whether the projection involves a symbol which is to be identified. However, there will appear at the output *ze* a symbol-end signal "1" only when the scanning point is actually positioned between the levels of the upper and lower limitations of a symbol which, as to the length thereof, that is, the length of its projection transverse of the direction of the scanning columns, might be a symbol which is to be identified, whereby the recognition is subsequently effected by an identification device (not shown) connected with the arrangement, to which the respective signals are conducted.

The symbol identification device may be operative to evaluate only the symbols for which symbol-end signals had been received while symbols for which only extinguish signals had been received are from the outset excluded from the processing by the identification device. Further explanations with respect to the operation of the symbol identification device proper are omitted here as being unnecessary for an understanding of the invention.

It may also be mentioned that it is entirely possible to ascertain, under the conditions shown in FIG. 1, the rearward limits of the symbol 3, despite the fact that the scanning column *m* which signals the rearward limits of the illustrated symbol, is not entirely free of scanning signal elements "1" corresponding to the coincidence of an element of a line course, since such scanning column extends over the prominently indicated part of the next following symbol, namely, the slanting fractional line.

It will therefore be seen that the method according to the invention, for ascertaining the rearward limits of a symbol, is particularly adapted for ascertaining without difficulty, the symbol end even in a case in which the projection of the involved symbol merges into the projection of an adjacent symbol, as it happens with slanting symbols, especially hand written symbols.

Changes may be made within the scope and spirit of the appended claims which define what is believed to be new and desired to have protected by Letters Patent.

We claim:

1. A circuit arrangement for establishing the rearward limits of written symbols which are in columnar manner being scanned for the automatic processing thereof, comprising means for comparing projection signal elements, representing the projections of an already scanned part of the scanning region transverse to the scanning direction, with corresponding scanning signal elements of a scanning column which is being scanned, to ascertain thereby, in the sequence of pairs of mutually corresponding projection signal elements and scanning signal elements, the appearance of signal element pairs ("10") which consist respectively of a projection signal element ("1") corresponding to the coincidence with an element of the line course with a scanning signal element ("0") corresponding to non-coincidence with an element of a line course, and lying directly between two signal element pairs ("00"), thereby establishing the rearward limits of a symbol that had just been scanned, said comparing means comprising a Neither-Nor gate and a blocking gate, input means for the respective gates, means for simultaneously conducting to the respective input means, in step-by-step manner, scanning signal elements produced in the columnar scanning of a symbol and indicating the presence or absence of an element of a line course and projection signal elements positionally corresponding thereto, an intermediate storer connected with said Neither-Nor gate, one input of a first And-gate connected with said intermediate storer, another input of said first And-gate connected with the output of said blocking gate, the output of said first And-gate being connected with a further intermediate storer which is connected with one input of a second And-gate having a second input connected with said Neither-Nor gate, the activation of said second And-gate indicating the establishment of the rearward limits of the symbol which had just been scanned.

2. A circuit arrangement according to claim 1, comprising means for ascertaining in the sequence of signal element pairs the appearance of a number of directly successive signal element pairs ("10") which number is not below a predetermined minimum number and does not exceed a predetermined maximum number, a third And-gate having an input connected with the output of said second And-gate, a bistable flip-flop circuit connected with another input of said third And-gate, a counting device connected with the output of said first And-gate for controlling the operation of said counting device, the control input of said flip-flop circuit being connected with the counting stage of said counting device corresponding to the predetermined minimum number of said signal element pairs, and the restoring input of said flip-flop circuit being connected with the counting stage of said counting device which corresponds to the predetermined maximum number of said signal element pairs.

3. A circuit arrangement according to claim 2, comprising a cycling register connected ahead of one input of said comparing device and having a storage capacity adapted for the storing of signal elements derived in the scanning of a scanning column, means for conducting to said cycling register scanning signal elements of each scanning column which elements correspond to the coincidence with an element of a line course, whereby said cycling register receives the respective projection of the part of the scanning region that had already been scanned, the projection signal elements stored in said cycling storer being conducted to said comparison device over said one input thereof, and means for simultaneously conducting to the other input of said comparison device the scanning signal elements of each scanned column which correspond to said projection signal elements.

4. A circuit arrangement according to claim 2, comprising a first counting device for counting the sequences of mutually directely adjacent projection signal elements ("1") and for marking the counting step attained at the instant of establishing the rearward limits of a symbol that had just been scanned, means for thereupon renewing said counting, and means, effective upon encountering in the course of said renewed counting said marked counting step, for the duration of the scanning along the respective sequence of projection signal elements ("1"), respectively the establishment of the rearward limits of a symbol that had just been scanned and also the position thereof, a further counting device for counting the sequences of mutually directly adjacent signal elements ("1") which are contained in the projection of the part of the scanning region that had been scanned and which correspond to the coincidence with an element of a line course, the activation of said second And-gate effecting marking, in said second counting device, of the counting steps attained at the instant of such activation, said second counting device releasing, in the course of reconducting thereto said projection signal elements, upon reaching the marked counting step, a signal ("1") to one input of a fourth And-gate the other input of which is connected with said cycling register, said signal indicating the establishment of the rearward limits of the respective symbol and the position thereof and being also effective for cancelling the projection of such symbol contained in said cycling register.

5. A circuit arrangement according to claim 4, wherein the activation of said third And-gate is effective to mark in said second counting device the counting steps reached thereby at the instant of such activation, said second counting device being, responsive to renewed extension of projection signal elements thereto and upon reaching said marked counting steps, effective to release a signal ("1") to one input of a fifth And-gate the other input of which is connected with said fourth And-gate, so as to produce at the output of said fifth And-gate a signal signifying the rearward limits of the involved symbol and the position thereof.

6. A circuit arrangement according to claim 4, wherein said second counting device comprises a forward count register having an input which is connected with said cycling register, such counting device also comprising an intermediate storage register which stores the counting steps of the forward count register which had been marked by the activation of the second And-gate and transfers said counting steps at the beginning of the next scanning column to a reverse count register, said latter register having a control input which is connected with the output of said cycling register, and the first stage of said reverse count register being connected to an input of the fourth And-gate.

7. A circuit arrangement according to claim 6, wherein said second counting device comprises a further intermediate storage register which stores counting steps of the forward count register, which had been marked by the activation of the third And-gate, transferring such stored counting steps at the beginning of the next scanning column to a further reverse count register the control input of which is connected with the output of said cycling register, the first stage of the latter being connected with one input of said fifth And-gate the other input of which is connected with the output of said fourth And-gate.

8. A circuit arrangement according to claim 6, comprising differentiating members respectively connected with said cycling register and predetermined count registers.

9. An arrangement for ascertaining the rearward limits of written symbols scanned in a columnar manner for the automatic processing thereof, comprising scanning means for the column-by-column scanning of a predetermined scanning range operative to generate scanning signal elements, which indicate in each case the scanning of a surface element covered or not covered by a symbol portion, means connected to said scanning means for the formation of projection signal elements representing projection, transversely to the scanning direction, of the already scanned portion of the scanning range, comparison means connected with said second-mentioned means for effecting a comparison of the projection signal elements with the scanning signal elements corresponding to those of the scanning column just scanned, in which the signal elements compared with one another positionally correspond in column direction, and further comparison means connected with said first comparison means, for comparing successive pairs of such projection and scanning signal elements corresponding to one another, to ascertain, in the succession of pairs of signal elements consisting of projection signal elements and scanning signal elements corresponding to one another, the occurrence of a number of signal element pairs "10" which consist in each case of a projection signal element "1" corresponding to a surface element covered by symbol portions, and a scanning signal element "0" corresponding to a surface element not covered by a symbol portion and which lie directly between two signal element pairs "00" which consist in each case of two signal elements "0" corresponding to surface elements not covered by symbol portions, whereby the identification of the rearward limits of a symbol just scanned is established.

10. An arrangement according to claim 9, wherein said further comparison means comprises a counting device for the determination of a number of successive signal element pairs "10" occurring in the sequence of signal element pairs, not falling below a prescribed minimum number and not exceeding a prescribed maximum number, which lies directly between two signal element pairs "00" to determine the arrival of the rearward limits of a symbol just scanned.

11. An arrangement according to claim 9, wherein the further comparison means is provided with a counting device for the counting of the sequences of directly contigouous projection signal elements "1" contained in the projection of the portion of the scanning range already scanned in each case, means for marking the counting step reached at the moment, in each case, of a determination of the rearward limit of a symbol just scanned and for subsequently renewing the counting of the sequences of directly continuous projection signal elements "1" contained in the particular part of the scanning range already scanned, and means operable upon such marking to signal for the duration of the scanning along the respective sequence of projection signal elements "1" corresponding to the coincidence of an element of a continuous series of lines, the establishment of the rearward limits of the symbol involved, and simultaneously its position.

References Cited by the Examiner

UNITED STATES PATENTS

| | | | |
|---|---|---|---|
| 2,838,602 | 6/1958 | Sprick | 340—146.3 |
| 2,889,535 | 6/1959 | Rochester et al. | 340—146.3 |
| 3,050,711 | 8/1962 | Harmon | 340—146.3 |
| 3,088,097 | 4/1963 | Steinbuch et al. | 340—146.3 |

OTHER REFERENCES

Pages 173–175, April 1957, "Reading by Electronics," published by Wireless World.

DARYL W. COOK, *Acting Primary Examiner.*

MALCOLM A. MORRISON, *Examiner.*

J. E. SMITH, *Assistant Examiner.*